Dec. 27, 1955   O. A. KERSHNER   2,728,429
CLUTCH CONSTRUCTION AND ACTUATING MEANS THEREFOR
Filed June 11, 1952   5 Sheets-Sheet 1
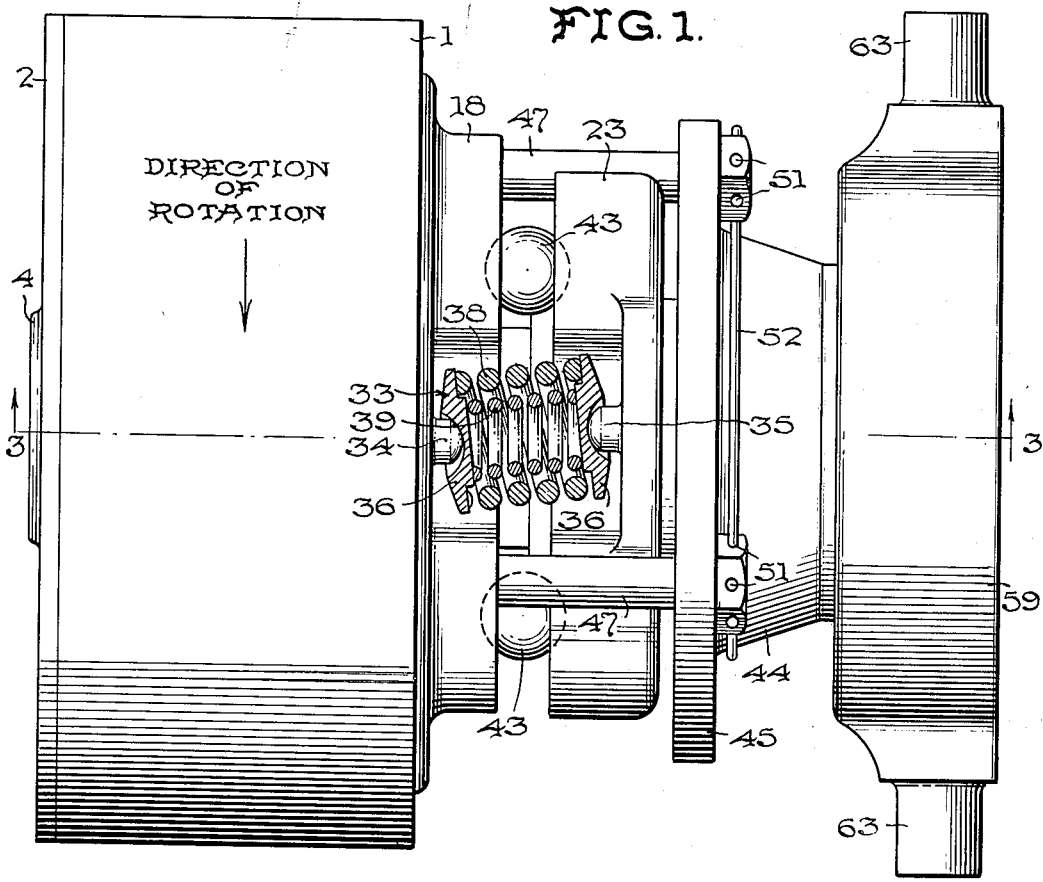
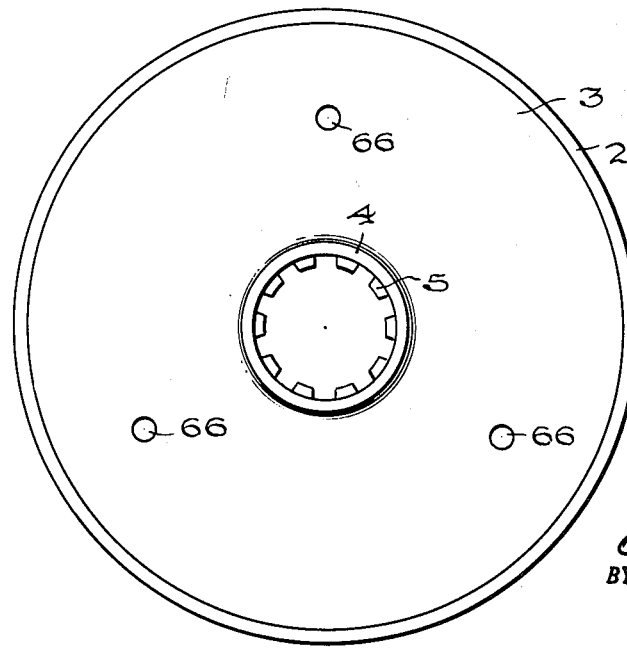
INVENTOR.
O. A. Kershner
BY
Robert Cobb
Attorneys

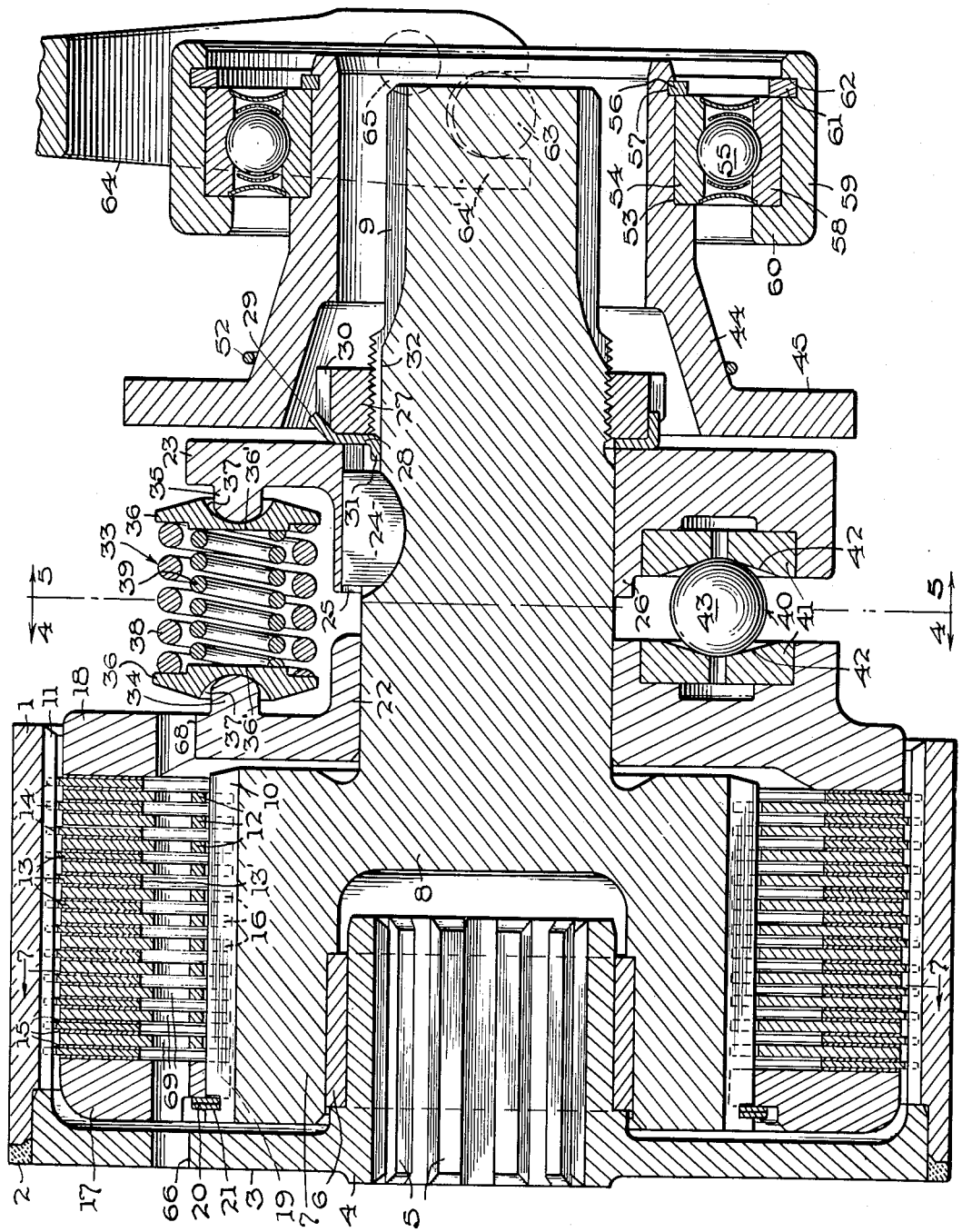

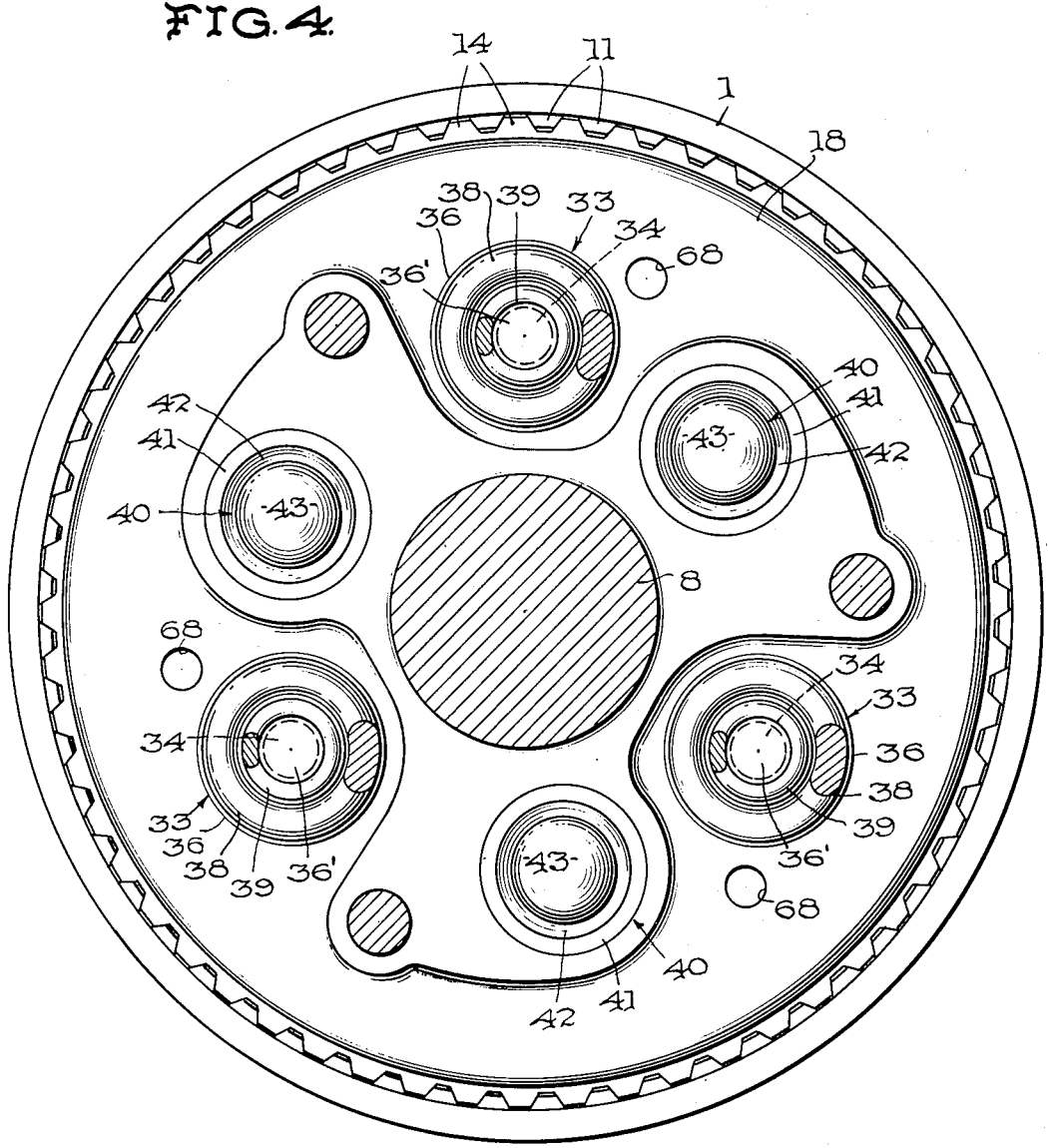

Dec. 27, 1955  O. A. KERSHNER  2,728,429
CLUTCH CONSTRUCTION AND ACTUATING MEANS THEREFOR
Filed June 11, 1952  5 Sheets-Sheet 4

INVENTOR.
O. A. Kershner
BY Robb & Robb
Attorneys

Dec. 27, 1955  O. A. KERSHNER  2,728,429
CLUTCH CONSTRUCTION AND ACTUATING MEANS THEREFOR
Filed June 11, 1952

INVENTOR.
O. A. Kershner
BY Robert Cobb
Attorneys.

United States Patent Office 2,728,429
Patented Dec. 27, 1955

2,728,429

CLUTCH CONSTRUCTION AND ACTUATING MEANS THEREFOR

Osborn A. Kershner, St. Joseph, Mich., assignor, by mesne assignments, to Lambert Brake Corporation, St. Joseph, Mich., a corporation of Michigan Application June 11, 1952, Serial No. 292,913

7 Claims. (Cl. 192—32)

The present invention relates to friction devices, and more particularly, to a friction device which is relatively small in size for its high capacity, but which is nevertheless strong and durable.

In many types of apparatus, power is transmitted through an environment of oil and the space limitations restrict the size of any power transmitting clutch which may be utilized. Where space limitations are involved in such apparatus, wet clutches operable in the oil, and of adequate capacity, usually cannot be employed without resorting to substantial alteration or re-design of the conventional transmission systems, thus entailing great expense and with resultant enlargement of the transmission housings. It is therefore highly desirable to provide a small but exceptionally powerful clutch which is capable of operation in such an oil environment.

Accordingly, it is a primary object of the present invention to provide a compact, high capacity clutch which may be availed of for various installations, such as in power transmission systems of motor vehicles wherein it is desired to provide a live power take-off for continuous operation of some auxiliary equipment, regardless of interruption of the main chain of power through the transmission. The clutch of this invention also has many diverse uses in power apparatus of other kinds, as will be apparent to those skilled in the art.

Another object is to provide a small, compact, powerful and efficient clutch which includes a pair of relatively rotatable members respectively adapted to be operatively connected to a power input and a power output shaft, one of these members carrying a pair of pressure plates, with one pressure plate shiftable towards and away from the other, a plurality of interleaved friction members, with alternate friction members slidably connected with one of the relatively rotatable members and the intermediate friction members being slidably connected with the other of the rotatable members, certain of said relatively rotatable members, pressure members, and friction members having means for affording ready access for oil into, around and between the respective clutch parts, whereby continuous and effective lubrication of all of the aforementioned clutch parts is assured, with attendant long life and trouble-free service.

A further object is to provide a clutch or an analogous friction device having improved means for engaging the same with an unusually smooth, noiseless, lag-free and powerful action not previously attained by the engaging means of friction devices of this general type.

Still another object is to provide a friction device according to the next preceding paragraph, which attains its objective by the utilization of engaging or energizing means which include a pair of relatively rotatable and axially shiftable plates or discs having camming means therebetween, and also having means for simultaneously shifting one of said plates or discs both axially and angularly or rotatively relative to the other plate or disc, whereby the camming means are maintained constantly in engagement with both plates or discs and are maintained in such an operative relation to said plates or discs as to instantly become operative upon engagement of the friction device to force said plates or discs axially apart with a powerful self-energizing action, according to the load on the friction device, thus avoiding all lag in the operation of the friction device, except for the slight load-responsive lag which effects the aforementioned self-energizing action.

With the foregoing objectives in view, as well as other objects and advantages which will be hereinafter set forth, one illustrative embodiment of the present invention will now be described in detail, and the novel features thereof defined in the appended claims.

In the drawings:

Fig. 1 is a plan view of one specific form of the invention, as embodied in a friction clutch assembly, with the clutch-engaging springs shown in section;

Fig. 2 is a view in elevation of the left-hand end of the clutch shown in Fig. 1;

Fig. 3 is a longitudinal sectional view, as taken on the line 3—3 of Fig. 1, but on a slightly enlarged scale, with certain of the parts shown in elevation;

Fig. 4 is a transverse sectional view, as taken on the line 4—4 of Fig. 3, looking toward the left-hand end of the clutch, with certain of the parts shown in elevation;

Figure 5:
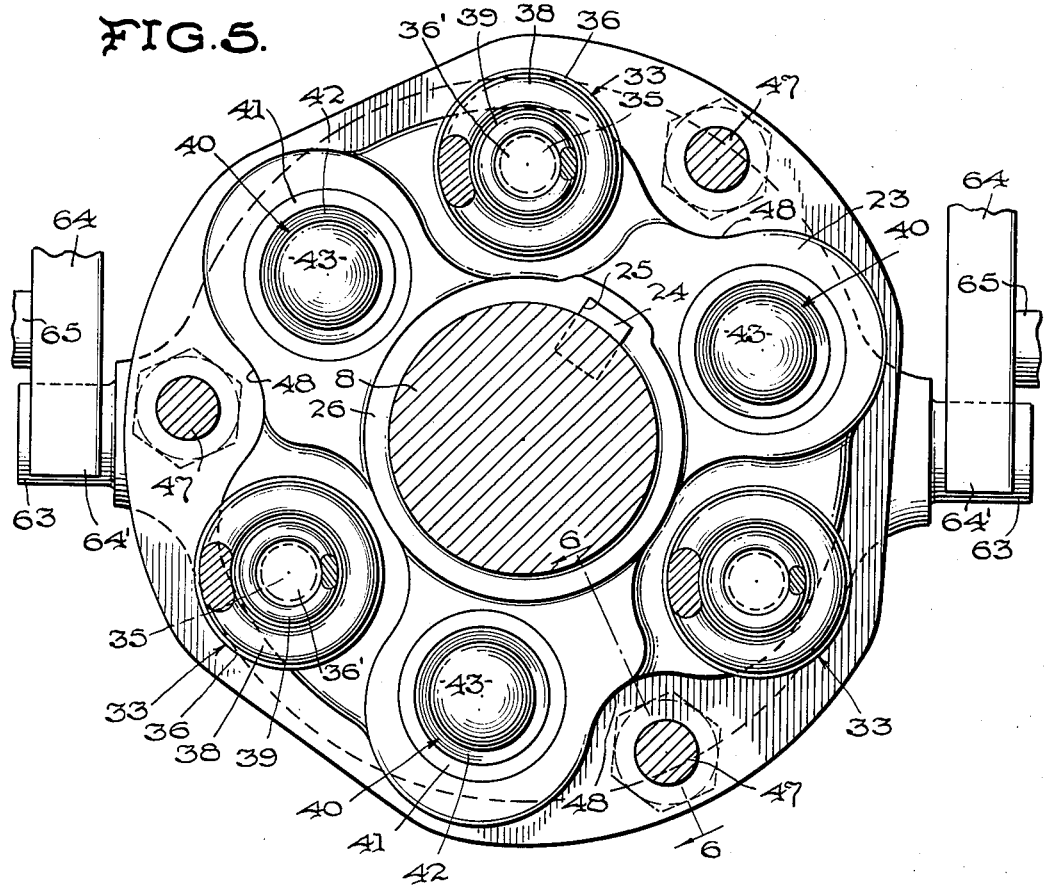
Fig. 5 is a transverse sectional view, as taken on the line 5—5 of Fig. 3, looking toward the right-hand end of the clutch, with certain of the parts shown in elevation.
Figure 6:
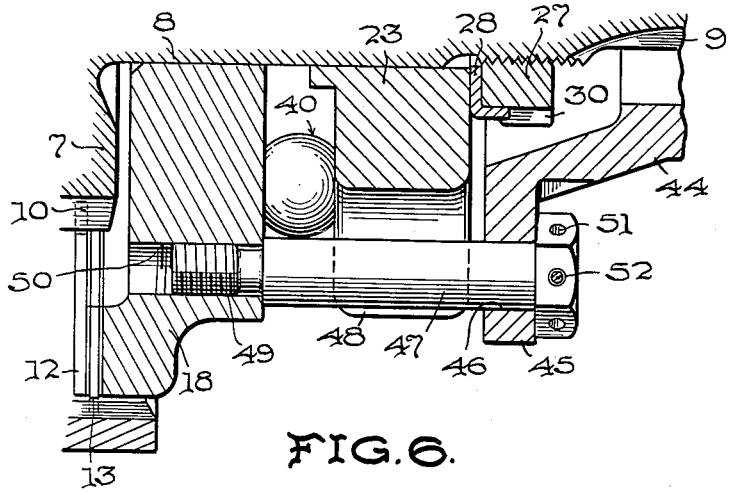
Fig. 6 is a fragmentary sectional view, as taken on the line 6—6 of Fig. 5, with certain of the parts shown in elevation.

Like reference characters designate corresponding parts in the several figures of the drawings, wherein 1 designates a cylindrical sleeve or casing member which is welded or otherwise suitably secured, as at 2, at one of its ends to a radial flange 3 of a central, hollow hub 4. Interiorly thereof, the hub 4 is provided with suitable means, such as a plurality of splines 5, for adapting the same to be operatively connected to a complementally splined shaft (not shown) which may be a power input or a power output shaft, according to the direction in which power is to be transmitted through the clutch. A suitable bearing 6 is fitted on the outer periphery of the hub 4, and rotatably mounted on the bearing 6 is an enlarged, hollow hub 7 of an axially extended clutch shaft 8. The end of this shaft 8 remote from the hub 7 is provided with suitable means, such as splines 9, for adapting the clutch shaft 8 to be connected to a complementally splined shaft (not shown) which may be either a power input or a power output shaft, according to the direction of transmission of power through the clutch.

The outer periphery of the hub 7 on the clutch shaft 8 is provided with a suitable number of circumferentially spaced splines 10 extending the full length thereof, and the cylindrical sleeve 1 is provided with a plurality of internal splines 11 circumferentially spaced about its inner periphery. Disposed between the sleeve 1 and the hub 7 is a pack of interleaved friction discs 12 and 13. The discs 13 constitute "middle discs" and are provided about their outer periphery with a plurality of splines 14 which mate with the splines 11 in the sleeve 1. The "middle discs" 13 are also preferably provided on their opposite side faces with suitable friction lining material 15. Spaced about the inner periphery of the discs 12 which constitute "intermediate" discs, is a plurality of splines 16 which mate with the splines 10 on the hub 7. Thus, it is seen that the discs 13 and 12 are respectively and solely carried by and will rotate with the hub 7 and the sleeve 1, but are free for axial shifting movements into and out of engagement with each other.

The means for axially shifting the discs 12 and 13 comprises a pair of axially spaced pressure plates or discs 17 and 18 disposed on opposite sides of the pack of friction discs, the plate 18 constituting a shiftable pressure plate for axially shifting the friction discs 12 and 13 into frictional engagement with each other and against the stationary plate 17 which is preferably in the form of an annulus having internal splines 19 engaged with the mating splines 10 on the hub 7, a snap ring 20, or the like, seating in radially disposed seats 21 in the splines 10, serving to secure the plate 17 against axial movement when pressure is put on the plate 18.

The aforementioned pressure plate 18 has a central hub portion 22 seating on the shaft 8 so as to be shiftable axially, as well as to be shiftable rotatively, relative to the shaft 8, for a purpose which will be hereinafter pointed out.

Mounted on the shaft 8 in opposed axially spaced relation to the pressure plate 18 is another disc or plate 23 which is keyed to the shaft 8 in a suitable manner, as by means of a key 24 engaged in a keyway 25 in a central hub 26 of the plate 23, so as to rotate with the shaft 8, but permitting axial adjustment thereon for adjusting the axial spacing between the opposed plates 18 and 23. Such axial adjustment of the plate 23 is preferably accomplished by means of an internally threaded nut 27 engaged with complemental threads on the shaft 8. A lock washer 28 serves to lock the nut 27 in position by means of a plurality of tangs 29 spaced about the outer periphery of the washer, and which are selectively engageable in a plurality of tang-receiving slots 30 in the outer periphery of the nut, the washer having a key portion 31 on its inner periphery engaging in a way 32 in the shaft 8 to prevent rotation of the washer and the nut on the shaft. Thus, the plate 23 is locked on the shaft 8 against axial movement to the right, as seen in Fig. 3, and so as to rotate with the shaft 8.

Interposed between the relatively stationary plate 23 and the shiftable pressure plate 18 is a number of clutch-engaging spring assemblies 33 which are preferably seated on axially extended buttons 34, 35, respectively, formed on the pressure plate 18 and the plate 23. Each spring assembly 33 preferably comprises opposed seats 36, each having in one of its sides a hemispherical recess 37 in which the respective buttons 34, 35 are adapted to seat, in order to allow substantially universal movements of the seats 36 thereon. The side of each seat 36 opposite the recess 37 is provided with a central, axial extension 36' about which is positioned an end coil of a helical or coil spring 38, and on which is seated an end coil of an inner coil spring 39. There are, preferably, three of these clutch-engaging spring assemblies 33, and they are disposed about the axis of the clutch assembly in equidistantly spaced relation, as is best seen in Figs. 4 and 5.

Also equidistantly spaced about the axis of the clutch assembly intermediate the shiftable pressure plate 18 and the relatively stationary plate 23, is a number of camming means 40 which are adapted to energize the clutch with a powerful self-energizing action responsive to load on the clutch tending to cause "slippage" thereof, as will be hereinafter more particularly described. These camming means preferably comprise opposed inserts 41 seated in correspondingly shaped recesses in the opposed faces of the respective plates 18 and 23, these inserts 41 each having a substantially conical seat 42 formed therein. A hardened ball 43 is interposed between each opposed pair of inserts 41, and engages in the conical seats 42 thereof.

Suitable throw-out mechanism is also provided for the clutch, and, in the illustrative embodiment, this throw-out mechanism comprises a hollow throw-out member 44 having a substantially annular flange 45 radially extended about its inner end. The throw-out member 44 is substantially bell-shaped and surrounds the end of the shaft 8 having the splines 9 thereon, but in spaced relation thereto, so as to afford clearance for a suitable adapter shaft, sleeve or the like (not shown) to be positioned on said end of the shaft 8 for connecting the latter to a rotatable shaft or other part to which the clutch is to be connected. Angularly and equidistantly spaced about the flange 45 is a suitable number, preferably three, bolt-receiving holes 46, through which pass a corresponding number of headed bolts 47. These bolts preferably have a plain shank portion which passes through arcuate clearance depressions 48 in the outer marginal edge of the relatively stationary plate 23, the shank end of the bolts being suitably screw-threaded, as at 49, for securing the same in correspondingly threaded openings 50 in the shiftable pressure plate 18, so as to connect said plate 18 to the throw-out member 44. As seen in Fig. 1, the heads of the bolts 47 are preferably provided with suitable openings 51 extending diametrically therethrough, whereby a tie-wire 52 may be utilized to lock said bolts 47 against inadvertent loosening when the clutch is in use.

Preferably, the outer or right-hand end of the throw-out member 44 is provided with a seat 53 for the inner race 54 of a suitable throw-out bearing 55, this bearing 55 being retained in place by a retaining ring 56, or the like, which is positioned in a peripheral groove 57 in the bearing seat 53.

Mounted on the outer race 58 of the bearing 55 is a throw-out collar 59 of annular form, and having a marginal flange 60 which engages one side of the race 58, while a retaining ring 61, seated in a groove 62 in the inner periphery of the collar 59, engages the other side of the race 58 to secure the collar 59 in place.

As best seen in Figs. 1 and 5, the throw-out collar 59 is preferably laterally extended at diametrically opposite points to provide trunnion projections 63 which are adapted to be engaged by a suitable operating means such as a yoke member 64 having suitable fulcrum members 65 adapted to be mounted on some adjacent stationary support (not shown). This yoke member has a forked end 64' on each arm thereof operatively engaged on the trunnion projections 63.

It is to be understood that the throw-out mechanism illustrated and described herein above may be readily changed without departing from the spirit of this invention.

The clutch of this invention is primarily intended for use in an environment of oil where conventional friction materials such as the fibrous linings or facings usually utilized in clutches are entirely ineffective. The friction linings 15 of the present clutch are preferably made of brass or the like, and due to the extremely powerful energization of this clutch, the resultant torque capacity for a clutch of this general size is very high. Therefore, the brass linings may quickly score and burn if not properly lubricated, and in accordance with one of the primary objectives of this invention, means are provided for assuring sufficient and efficient lubrication of the friction surfaces of the clutch at all times by the oil contained in the transmission or the like, with which the clutch is adapted to be associated.

Figure 7:
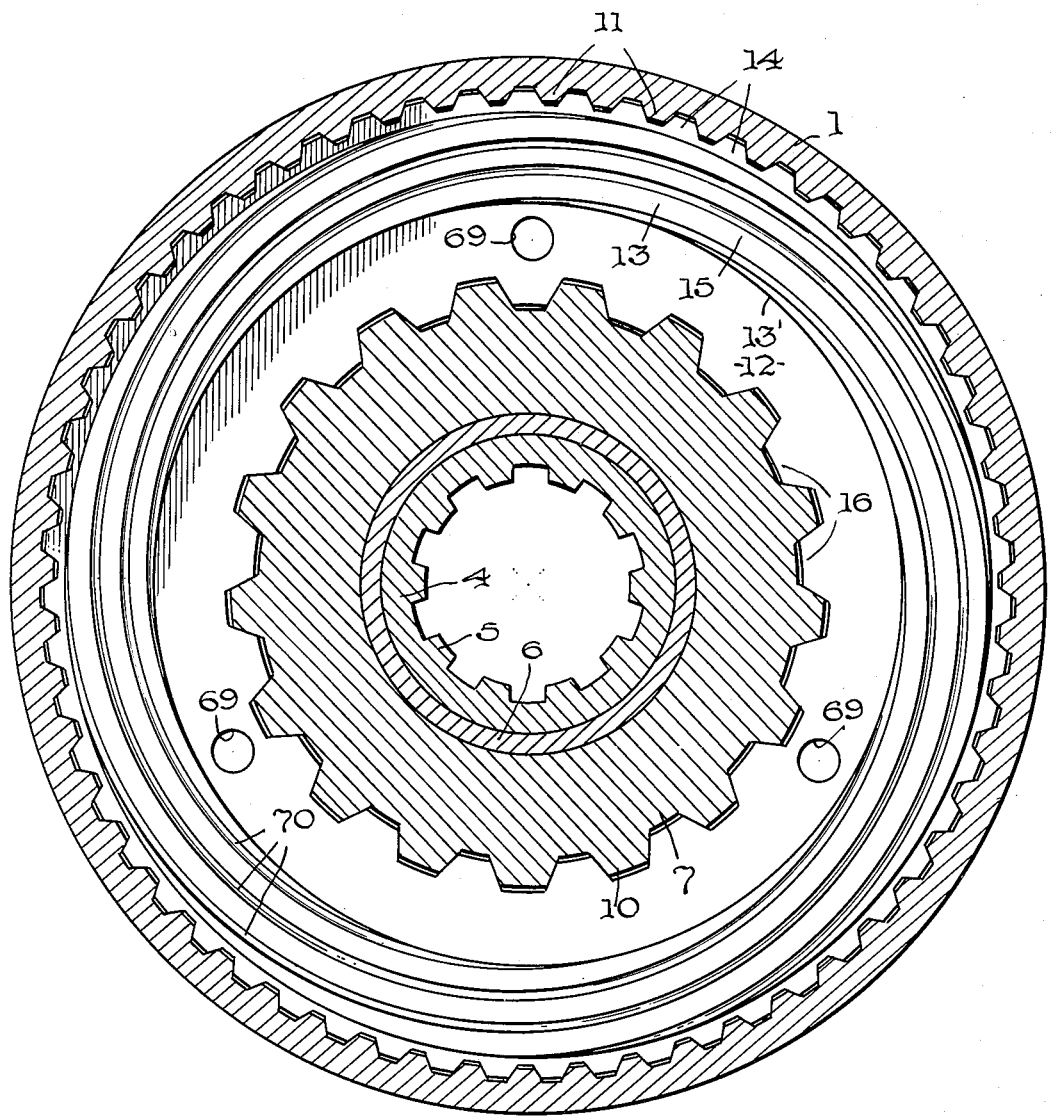
Fig. 7 is a transverse sectional view, as taken on the plane of the line 7—7 of Fig. 3, looking toward the left-hand end of the clutch.

In this connection, I provide the flange 3 on which the sleeve 1 is mounted, with a suitable number of circumferentially spaced openings or passages 66 through which oil is free to pass. These openings 66 are located in the area of the flange 3 aligned with the pack of friction discs 12 and 13. The splined flange 17 on the hub 7 is also provided with a plurality of oil openings or passages 67 which are in substantial alignment with the aforementioned openings 66, and through which oil may freely pass into the zone of the friction discs 12 and 13. In addition, the shiftable pressure plate 18 is provided with a plurality of oil openings or passages 68, through which oil may pass from this side of the friction pack into the zone of the discs 12 and 13. Each intermediate disc 12, adjacent its inner periphery, is also provided with a plurality of oil openings or passages 69 forming an endless passage through the pack and through which oil may pass from either end of the friction pack toward the center thereof, in order to fully lubricate all of the friction surfaces. As is best seen in Figs. 3 and 7, each disc 13 has its inner peripheral edge 13' radially spaced from the passages 69 in the discs 12, so as to allow uninterrupted flow of oil through the passages 69, since the body of each disc 13 extends radially inward from its outer periphery only about one-half the distance of the discs 12.

In use, the oil film on the friction surfaces must be quickly displaced in order to attain a maximum torque capacity in a minimum time. Therefore, the outer friction face of each friction lining 15 is preferably provided with spirally arranged grooves 70 (see Fig. 7), into which the above-mentioned oil film is quickly and easily forced when the clutch is engaged. By reason of the fact that these grooves 70 merge into the inner peripheral edge of the friction linings 15, as well as into the outer peripheral edge thereof, they also serve to pick up oil and carry the same inwardly of the peripheries thereof, so as to aid in the distribution of oil. Thus, it is seen that when the present clutch is used in an oil environment, all of the parts thereof are fully lubricated, and the clutch is, therefore, capable of operation for prolonged periods of time without appreciable wear or need for service or adjustment.

In accordance with another of the salient features of the present invention, means are provided to substantially eliminate any lag in the engagement of the clutch, except for such minute lag as is necessary to effectuate the self-energization of the clutch responsive to the load thereon.

In this connection, and with particular reference to Fig. 1 of the drawings, it is seen that the buttons 34, 35 which are respectively formed on the plates 17 and 18, are not in axial alignment with each other in a longitudinal direction, i. e., the button 34 is angularly or rotatively displaced relative to the button 35, but preferably they are in alignment and equally spaced in a radial direction relative to the axis of the clutch (see Fig. 3). The spring assemblies 33 are of such a length as to normally force the pressure plate 18 to the position shown in Fig. 1 for engaging the clutch, in a manner which will be hereinafter described, and the springs are preferably cocked at an angle of approximately 7° relative to the axes of the buttons 35 and in the direction of rotation of the clutch which is indicated by the arrow on the sleeve 1 in Fig. 1.

The operation of the clutch hereinbefore described is as follows, with particular reference to Figs. 1 and 3:

The clutch in these figures is shown in a condition, with no torque being transmitted therethrough, i. e., in a condition such as when a piece of equipment with which it may be associated is at rest. Initially, the clutch is disengaged by suitable operating mechanism (not shown), such as a foot pedal, or the like, which may be suitably connected to the yoke member 64 so as to rock the same on the pivots 65 in a counter-clockwise direction, as seen in Fig. 3. This rocking of the yoke 64 will shift the throw-out mechanism 44, 45, 55, 59 axially to the right, and the bolts 47 will pull the shiftable pressure plate axially toward the stationary plate 23, thus relieving all pressure from the friction discs 12 and 13, and rendering the same free for rotation relative to each other.

Now, assuming the hub 4 to be connected to a power input shaft, the clutch shaft 8 to be connected to a power output shaft, and such power input shaft to be rotating, it is clear that the clutch is disengaged and the shaft 8 and the discs 12 thereon are idling when the throw-out mechanism is operated as just described. To engage the clutch, the aforementioned foot pedal will be released, allowing the shiftable pressure plate 18 to be shifted into a clutch-engaging position by the clutch springs 33.

This clutch-engaging action of the springs 33, due to their being disposed at an angle as aforesaid, is such that the pressure plate 18 is simultaneously shifted axially and angularly so that the balls 43 are caused to roll up in the conical seats 42 of the opposed inserts 41. As the pressure plate 18 forces the friction discs 12 and 13 to the left, and presses the same up against the relatively stationary plate or flange 17, torque will be transmitted through the friction discs 12 and 13 from the sleeve 1 which is rotating with the aforementioned input shaft (not shown) to the clutch shaft 8.

Since the pressure plate 18 is now in frictional contact with the contiguous friction disc 13, any tendency of the clutch shaft and the discs 12 carried thereby to lag due to load thereon will effect self-energization of the clutch by the balls 43. This energization occurs immediately upon engagement of the clutch, thus avoiding or eliminating substantially all lag or slippage in the clutch.

Self-energization is accomplished by reason of the pressure plate 18 rotating slightly on the clutch shaft 8 when the friction disc 13 with which it is engaged tends to rotate faster than the shaft 8; therefore, the pressure plate 18 rotates slightly relative to the stationary plate 23, causing the balls 43 to ride up further out of the seats 42, thereby positively forcing the plates 18 and 23 axially apart with a powerful camming action, which is directly proportional to the load on the clutch.

Upon initial engagement of the clutch, all oil on the opposed friction faces of the discs 12 and 13 and plates 17 and 18 is quickly forced into the grooves 70 in the lining material 15, and accordingly, the oil does not impair the powerful action of the clutch which has an extremely high torque capacity for its relatively small size. In fact, a clutch made in accordance with this invention, and having an overall diameter of approximately 6 inches, has more than the required torque capacity needed to provide a live power take-off for continuous operation of heavy auxiliary farm equipment operated by the power take-off shaft of a farm tractor.

Therefore, it is seen that a clutch embodying this invention is ideally suited for installation in the oil-containing transmission of a vehicle or other power system without requiring any enlargement or modification thereof, or for installation in any location where a clutch of high torque capacity is desirable and where the space limitations were heretofore prohibitive, without resorting to reconstruction or other modification.

While the specific details of the invention have been herein shown and described, changes and alterations may be resorted to without departing from the spirit thereof as defined in the appended claims.

I claim:

1. A friction device of the class described, comprising a pair of relatively rotatable members, relatively rotatable axially shiftable friction means carried by said members, shiftable means for shifting said friction means axially into frictional engagement with each other, means engaged with said shiftable means for shifting the same in opposite directions comprising a relatively stationary member disposed in spaced relation to said shiftable means, an axially shiftable and rotatable operator member to shift said shiftable means in a direction to allow disengagement of said friction means, said relatively stationary member being disposed between said shiftable means and said operator member, means spanning said stationary member about its outer periphery and interconnecting said operator member and said shiftable means, resilient means interposed between said shiftable means and said relatively stationary member for simultaneously shifting the shiftable means axially away from said relatively stationary member and angularly relative thereto in a direction to effect engagement of said friction means, and self-energizing means operative upon said shiftable means for positively shifting the same further axially responsive to angular movement thereof resulting from said shiftable means engaging said friction means.

2. A friction device as defined in claim 1, wherein said shiftable means comprises a plate freely mounted on one of said relatively rotatable members, and said relatively stationary member comprises a plate fixedly mounted on said one of the relatively rotatable members, and said resilient means comprises a coil spring seated at its opposite ends on the respective plates and disposed parallel to the axis of the friction device, but having its own axis disposed at an angle to said relatively stationary plate member so as to urge said shiftable plate in the direction of rotation of said one of said relatively rotatable members.

3. Operating means for a friction device of the class described, comprising a support, a pair of discs and a throw-out member carried by said support in axially spaced opposed relation to each other, one of said discs being relatively fixed and being disposed between said throw-out member and the other disc, the other of said discs being shiftable axially and rotatively, means spanning the relatively fixed disc at its outer periphery and interconnecting the shiftable disc to said throw-out member to shift the shiftable disc towards the relatively fixed disc, spring means interposed between said discs on an axis cocked at an angle relative to said discs, so as to urge said shiftable disc simultaneously in an axial direction away from said relatively fixed disc and rotatively relative thereto, and cooperative camming means carried by said discs and disposed therebetween, said camming means being operative to spread said discs apart upon rotation of one disc relative to the other.

4. Operating means for a friction device of the class described, comprising a support, a pair of discs and a throw-out member carried by said support in axially spaced opposed relation to each other, one of said discs being relatively fixed and being disposed between said throw-out member and the other disc, the other of said discs being shiftable axially and rotatively, means spanning the relatively fixed disc at its outer periphery and interconnecting the shiftable disc to said throw-out member to shift the shiftable disc towards the relatively fixed disc, thrust means interposed between the discs on an axis cocked at an angle relative to said discs, so as to shift said shiftable disc simultaneously in an axial direction away from said relatively fixed disc and rotatively relative thereto, and cooperative camming means carried by said discs and disposed therebetween, said camming means being operative to spread said discs apart upon rotation of one disc relative to the other.

5. Clutch operating mechanism of the class described, comprising a pair of plates disposed in side-by-side spaced relation, one of said plates having depressions about its outer periphery, fastener means connected at one end to the other of said plates and projecting axially through said depressions, and an operator member connected to the last-mentioned plate at the other end of said fastener means and adapted to shift the latter plate towards the other plate, resilient means interposed between and interengaged with said plates and having its axis of thrust disposed at an angle for exerting a rotative force on one of the plates to shift the latter plate rotatively relative to the other, and camming means interposed between said plates to shift one of the plates axially relative to the other upon relative rotation of said plates.

6. A friction device of the class described, comprising a pair of relatively rotatable members, friction means on said members and relatively shiftable into and out of engagement to respectively transmit torque from one member to the other and to interrupt such torque transmission, and means for effecting such relative movement of the friction means including a shiftable pressure plate engageable with said friction means to shift the same, a throw-out member spaced from said pressure plate, a power plate between the pressure plate and the throw-out member, said throw-out member and said pressure plate extending radially outwardly beyond the power plate, fastener means interengaged with said throw-out member and said pressure plate at a point radially outwardly from said power plate and interconnecting said throw-out member with said power plate, spring means interposed between and interengaged with said power plate and said pressure plate and having its axis of thrust disposed at an angle for exerting a rotative force on said pressure plate to cause rotation of said pressure plate, and camming means between said plates for camming said pressure plate axially responsive to rotation of said pressure plate.

7. The combination of a wet clutch adapted to operate in an environment of oil and operating means for effecting engagement of said clutch, said operating means including a rotatable and axially shiftable clutch pressure plate, a relatively stationary member disposed in axially spaced relation to said pressure plate, resilient means interengaged between said pressure plate and said stationary member and having its axis of thrust disposed at an angle in the direction of rotation of said pressure plate relative to said stationary member to exert a rotative force upon the pressure plate, and camming means interposed between said pressure plate and stationary member for positively forcing said pressure plate axially away from said stationary member responsive to rotation of the pressure plate to effect engagement of said clutch.

References Cited in the file of this patent

UNITED STATES PATENTS

| Number | Name | Date |
|---|---|---|
| 936,190 | Tuckfield | Oct. 5, 1909 |
| 1,122,119 | Huff | Dec. 22, 1914 |
| 1,380,823 | Matthews et al. | June 7, 1921 |
| 1,654,911 | Bartholomew | Jan. 3, 1928 |
| 1,702,116 | Hoffman | Feb. 12, 1929 |
| 1,928,301 | Pierson | Sept. 26, 1933 |
| 2,054,377 | Havill et al. | Sept. 15, 1936 |
| 2,230,520 | Wemp | Feb. 4, 1941 |
| 2,308,679 | Eason | Jan. 19, 1943 |
| 2,407,022 | Lambert | Sept. 3, 1946 |
| 2,407,699 | Hill | Sept. 17, 1946 |
| 2,523,501 | Davies et al. | Sept. 26, 1950 |
| 2,690,248 | McDowall | Sept. 28, 1954 |

FOREIGN PATENTS

| Number | Country | Date |
|---|---|---|
| 66,357 | Denmark | Dec. 22, 1914 |
| 579,061 | Germany | June 21, 1933 |
| 607,042 | Germany | Dec. 15, 1934 |